(12) United States Patent
Shpunt (10) Patent No.: US 8,350,847 B2
(45) Date of Patent: Jan. 8, 2013

(54) DEPTH MAPPING USING MULTI-BEAM ILLUMINATION

(75) Inventor: Alexander Shpunt, Cambridge, MA (US)

(73) Assignee: Primesense Ltd, Tel Aviv (IL)

( * ) Notice: Subject to any disclaimer, the term of this patent is extended or adjusted under 35 U.S.C. 154(b) by 514 days.

(21) Appl. No.: 12/522,172

(22) PCT Filed: Jan. 21, 2008

(86) PCT No.: PCT/IL2008/000095
§ 371 (c)(1),
(2), (4) Date: Jul. 5, 2009

(87) PCT Pub. No.: WO2008/087652
PCT Pub. Date: Jul. 24, 2008

(65) Prior Publication Data
US 2010/0020078 A1      Jan. 28, 2010

Related U.S. Application Data

(60) Provisional application No. 60/885,899, filed on Jan. 21, 2007.

(51) Int. Cl.
*G06T 15/00* (2006.01)
*G06T 17/00* (2006.01)
(52) U.S. Cl. .......................................... 345/419; 345/420
(58) Field of Classification Search .................. None
See application file for complete search history.

(56) References Cited

U.S. PATENT DOCUMENTS

| | | | |
|---|---|---|---|
| 4,336,978 A | 6/1982 | Suzuki | |
| 4,542,376 A | 9/1985 | Bass et al. | |
| 4,802,759 A | 2/1989 | Matsumoto et al. | |
| 4,843,568 A | 6/1989 | Krueger et al. | |
| 5,075,562 A | 12/1991 | Greivenkamp, Jr. et al. | |
| 5,483,261 A | 1/1996 | Yasutake | |
| 5,630,043 A | 5/1997 | Uhlin | |
| 5,636,025 A | 6/1997 | Bieman | |
| 5,835,218 A | 11/1998 | Harding | |
| 5,838,428 A | 11/1998 | Pipitone et al. | |
| 5,856,871 A | 1/1999 | Cabib et al. | |
| 5,909,312 A | 6/1999 | Mendlovic et al. | |

(Continued)

FOREIGN PATENT DOCUMENTS
DE      19736169 A1      8/1997
(Continued)

OTHER PUBLICATIONS

U.S. Appl. No. 60/809,551 of PG/PUB US201001288211.*
(Continued)

*Primary Examiner* — Hau Nguyen
*Assistant Examiner* — Leon T Cain, II
(74) *Attorney, Agent, or Firm* — D. Kligler I.P. Services Ltd.

(57) ABSTRACT

A method for mapping an object (28) includes illuminating the object with at least two beams (37, 38) of radiation having different beam characteristics. At least one image of the object is captured under illumination with each of the at least two beams. The at least one image is processed to detect local differences in an intensity of the illumination cast on the object by the at least two beams, and the local differences are analyzed in order to generate a three-dimensional (3D) map of the object.

34 Claims, 4 Drawing Sheets

U.S. PATENT DOCUMENTS

| | | | |
|---|---|---|---|
| 6,041,140 A | 3/2000 | Binns et al. | |
| 6,081,269 A * | 6/2000 | Quarendon | 345/419 |
| 6,084,712 A | 7/2000 | Harding | |
| 6,088,105 A | 7/2000 | Link | |
| 6,099,134 A | 8/2000 | Taniguchi et al. | |
| 6,100,517 A | 8/2000 | Yahav et al. | |
| 6,101,269 A | 8/2000 | Hunter et al. | |
| 6,108,036 A | 8/2000 | Harada et al. | |
| 6,167,151 A | 12/2000 | Albeck et al. | |
| 6,259,561 B1 | 7/2001 | George et al. | |
| 6,262,740 B1 | 7/2001 | Lauer et al. | |
| 6,268,923 B1 | 7/2001 | Michniewicz et al. | |
| 6,301,059 B1 | 10/2001 | Huang et al. | |
| 6,438,263 B2 | 8/2002 | Albeck et al. | |
| 6,494,837 B2 | 12/2002 | Kim et al. | |
| 6,495,848 B1 | 12/2002 | Rubbert | |
| 6,686,921 B1 | 2/2004 | Rushmeier et al. | |
| 6,731,391 B1 | 5/2004 | Kao et al. | |
| 6,741,251 B2 | 5/2004 | Malzbender | |
| 6,751,344 B1 | 6/2004 | Grumbine | |
| 6,754,370 B1 | 6/2004 | Hall-Holt et al. | |
| 6,803,777 B2 | 10/2004 | Pfaff et al. | |
| 6,813,440 B1 | 11/2004 | Yu et al. | |
| 6,825,985 B2 | 11/2004 | Brown et al. | |
| 6,841,780 B2 | 1/2005 | Cofer et al. | |
| 6,859,326 B2 | 2/2005 | Sales | |
| 6,937,348 B2 | 8/2005 | Geng | |
| 7,006,952 B1 | 2/2006 | Matsumoto et al. | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,194,105 B2 | 3/2007 | Hersch et al. | |
| 7,256,899 B1 * | 8/2007 | Faul et al. | 356/623 |
| 7,335,898 B2 | 2/2008 | Donders et al. | |
| 7,369,685 B2 | 5/2008 | DeLean | |
| 7,433,024 B2 | 10/2008 | Garcia et al. | |
| 7,551,719 B2 | 6/2009 | Yokhin et al. | |
| 7,659,995 B2 * | 2/2010 | Knighton et al. | 356/608 |
| 7,751,063 B2 * | 7/2010 | Dillon et al. | 356/511 |
| 7,840,031 B2 * | 11/2010 | Albertson et al. | 382/103 |
| 2001/0016063 A1 | 8/2001 | Albeck et al. | |
| 2002/0041327 A1 | 4/2002 | Hildreth et al. | |
| 2002/0075456 A1 | 6/2002 | Shiratani | |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2005/0052637 A1 | 3/2005 | Shaw et al. | |
| 2005/0200838 A1 | 9/2005 | Shaw et al. | |
| 2005/0200925 A1 | 9/2005 | Brotherton-Ratcliffe et al. | |
| 2005/0231465 A1 | 10/2005 | DePue et al. | |
| 2005/0271279 A1 | 12/2005 | Fujimura et al. | |
| 2006/0072851 A1 | 4/2006 | Kang et al. | |
| 2006/0156756 A1 | 7/2006 | Becke | |
| 2007/0057946 A1 | 3/2007 | Albeck et al. | |
| 2007/0060336 A1 | 3/2007 | Marks et al. | |
| 2007/0165243 A1 | 7/2007 | Kang et al. | |
| 2008/0018595 A1 | 1/2008 | Hildreth et al. | |
| 2008/0031513 A1 | 2/2008 | Hart | |
| 2008/0106746 A1 | 5/2008 | Shpunt et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0247670 A1 | 10/2008 | Tam et al. | |
| 2009/0016642 A1 | 1/2009 | Hart | |
| 2009/0096783 A1 | 4/2009 | Shpunt | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2010/0007717 A1 | 1/2010 | Spektor et al. | |
| 2010/0013860 A1 | 1/2010 | Mandella et al. | |
| 2010/0118123 A1 | 5/2010 | Freedman et al. | |
| 2010/0128221 A1 * | 5/2010 | Muller et al. | 351/207 |
| 2010/0177164 A1 | 7/2010 | Zalevsky | |
| 2010/0194745 A1 | 8/2010 | Leister et al. | |
| 2010/0201811 A1 | 8/2010 | Garcia et al. | |
| 2010/0225746 A1 | 9/2010 | Shpunt et al. | |
| 2010/0265316 A1 | 10/2010 | Sali et al. | |
| 2010/0290698 A1 | 11/2010 | Shpunt et al. | |
| 2011/0025827 A1 | 2/2011 | Shpunt et al. | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0158508 A1 | 6/2011 | Shpunt et al. | |
| 2011/0211044 A1 | 9/2011 | Shpunt et al. | |

FOREIGN PATENT DOCUMENTS

| | | | |
|---|---|---|---|
| DE | 19638727 A1 | 3/1998 | |
| GB | 2352901 A | 2/2001 | |
| JP | 62206684 A | 9/1987 | |
| JP | 01-240863 | 9/1989 | |
| JP | 03-029806 U | 2/1991 | |
| JP | 06-273432 | 9/1994 | |
| JP | 2001141430 A | 5/2001 | |
| JP | 2002122417 A | 4/2002 | |
| JP | 2002-213931 A | 7/2002 | |
| JP | 2002-365023 A | 12/2002 | |
| WO | 9303579 A1 | 2/1993 | |
| WO | 9827514 A2 | 6/1998 | |
| WO | 9828593 A1 | 7/1998 | |
| WO | 9828593 A2 | 7/1998 | |
| WO | 2005010825 A2 | 2/2005 | |
| WO | 2007043036 A1 | 4/2007 | |
| WO | 2007096893 A2 | 8/2007 | |
| WO | 2007105205 A2 | 9/2007 | |
| WO | 2007105215 A2 | 9/2007 | |
| WO | 2008120217 A2 | 10/2008 | |

OTHER PUBLICATIONS

U.S. Appl. No. 60/669,039 of US Patent 7751063.*

Engfield, N., "Use of Pseudorandom Encoded Grid in U.S. Appl. No. 11/899,542", Andrews Robichaud, Jun. 22, 2011.

U.S. Appl. No. 61/471,215, filed Apr. 4, 2011.

Chinese Patent Application # 200680038004.2 Official Action dated Aug. 3, 2011 (English translation).

International Application PCT/IB2011/053560 filed on Aug. 10, 2011.

U.S. Appl. No. 61/419,891, filed Dec. 6, 2010.

U.S. Appl. No. 61/415,352, filed Nov. 19, 2010.

International Application PCT/IL2008/000995 Search Report dated Jul. 24, 2008.

Iizuka, K., "Divergence-Ratio Axi-Vision Camera (Divcam): A Distance Mapping Camera", Review of Scientific Instruments 77, 0451111 (2006).

Achan et al., "Phase Unwrapping by Minimizing Kikuchi Free Energy", IEEE International Geoscience and Remote Sensing Symposium, pp. 1738-1740, Toronto, Canada, Jun. 2002.

Piestun et al., "Wave Fields in Three Dimensions: Analysis and Synthesis", Journal of the Optical Society of America A, vol. 13, No. 9,1837-1848, Sep. 1996.

Lavoie et al., "3-D Object Model Recovery From 2-D Images Using Structured Light", IEEE Transactions on Instrumentation and Measurement, vol. 53, No. 2, pp. 437-443, Apr. 2004.

Chinese Application # 200780016625.5 Office Action dated May 12, 2011.

U.S. Appl. No. 11/899,542 Office Action dated Apr. 4, 2011.

U.S. Appl. No. 11/724,068 Office Action dated Mar. 1, 2011.

Chinese Application # 200780009053.8 Office Action dated Mar. 10, 2011.

Japanese Application # 2008535179 Office Action dated Apr. 1, 2011.

Kun et al., "Gaussian Laser Beam Spatial Distribution Measurement by Speckles Displacement Method", HICH Power Laser and Particle Beams, vol. 12, No. 2, Apr. 2000.

Chinese Patent Application # 200680038004.2 Official Action dated Dec. 24, 2010.

Theocaris et al., "Radial Gratings as Moire Gauges", Journal of Scientific Instruments (Journal of Physics E), series 2, vol. 1, year 1968.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

Ypsilos et al., "Speech-Driven Face Synthesis from 3D Video", 2nd International Symposium on 3D Processing, Visualization and Transmission, Thessaloniki, Greece, Sep. 6-9, 2004.

Ypsilos et al., "Video-Rate Capture of Dynamic Face Shape and Appearance", Sixth IEEE International Conference on Automatic Face and Gesture Recognition (FGR 2004), Seoul, Korea, May 17-19, 2004.

Zhang et al., "Height Recovery from Intensity Gradients", Proceedings of IEEE Computer Society Conference on Computer Vision and Pattern Recognition, pp. 508-513, year 1994.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.

Zhang et al., "Shape from Intensity Gradient", IEEE Transactions on Systems, Man and Cybernetics—Part A: Systems and Humans, vol. 29, No. 3, pp. 318-325, May 1994.

Zigelman et al., "Texture Mapping Using Surface Flattening via Multi-Dimensional Scaling", IEEE Transactions on Visualization and Computer Graphics, vol. 8, issue 2, pp. 198-207, Aug. 7, 2002.

Garcia et al., U.S. Appl. No. 61/151,853 "Depth Ranging with Moire Patterns" filed Feb. 12, 2009.

Hovanesian et al., "Moire Contour-Sum Contour-Difference, and Vibration Analysis of Arbitrary Objects", Applied Optics Journal, vol. 10, No. 12, pp. 2734-2738, Dec. 1971.

International Application PCT/IL2008/000095 Search Report dated Jul. 24, 2008.

Abramson, N., "Holographic Contouring by Translation", Applied Optics Journal, vol. 15, No. 4, pp. 1018-1976, Apr. 1976.

Tay et al., "Grating Projection System for Surface Contour Measurement", Applied Optics Journal, vol. 44, No. 8, pp. 1393-1400, Mar. 10, 2005.

Asada et al., "Determining Surface Orientation by Projecting a Stripe Pattern", IEEE Transactions on Pattern Analysis and Machine Intelligence, vol. 10, No. 5, year 1988.

Avidan et al., "Trajectory Triangulation: 3D Reconstruction of Moving Points from Amonocular Image Sequence", IEEE Transactions on Pattern Analysis and Machine Intelligence, vol. 22, No. 4, pages, Apr. 2000.

Besl, P., "Active Optical Range Imaging Sensors", Machine Vision and Applications, No. 1, pp. 127-152, USA 1988.

Brooks et al., "Moire Gauging Using Optical Interference Patterns", Applied Optics Journal, vol. 8, No. 5, pp. 935-940, May 1969.

Bruckstein, A., "On Shape from Shading", Computer Vision, Graphics, and Image Processing, vol. 44, pp. 139-154, year 1988.

Bryngdahl, O., "Characteristics of Superposed Patterns in Optics", Journal of Optical Society of America, vol. 66, No. 2, pp. 87-94, Feb. 1976.

Chen et al., "Measuring of a Three-Dimensional Surface by Use of a Spatial Distance Computation", Applied Optics Journal, vol. 42, issue 11, pp. 1958-1972, 2003.

Chen et al., "Overview of Three-Dimensional Shape Measurement Using Optical Methods", Society of Photo-Optical Instrumentation Engineers Journal 39(1), pp. 10-22, Jan. 2000.

Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.

Dainty, J.C., "Introduction", Laser Speckle and Related Phenomena, pp. 1-7, Springer-Verlag, Berlin Heidelberg, 1975.

Doty, J.L., "Projection Moire for Remote Contour Analysis", Journal of Optical Society of America, vol. 73, No. 3, pp. 366-372, Mar. 1983.

Ben Eliezer et al., "Experimental Realization of an Imaging System with an Extended Depth of Field", Applied Optics Journal, vol. 44, No. 14, pp. 2792-2798, May 10, 2005.

Garcia et al., "Three Dimensional Mapping and Range Measurement by Means of Projected Speckle Patterns", Applied Optics Journal, vol. 47, No. 16, pp. 3032-3040, Jun. 1, 2008.

Goodman, J.W., "Statistical Properties of Laser Speckle Patterns", Laser Speckle and Related Phenomena, pp. 9-75, Springer-Verlag, Berlin Heidelberg, 1975.

Hanson et al. "Optics and Fluid Dynamics Department", Annual Progress Report for 1997 (an abstract).

Hart, D., U.S. Appl. No. 09/616,606 "Method and System for High Resolution, Ultra Fast 3-D Imaging" filed on Jul. 14, 2000.

Hildebrand et al., "Multiple-Wavelength and Multiple-Source Holography Applied to Contour Generation", Journal of Optical Society of America Journal, vol. 57, No. 2, pp. 155-162, Feb. 1967.

Horn et al., "Toward Optimal Structured Light Patterns", Proceedings of International Conference on Recent Advances in 3D Digital Imaging and Modeling, pp. 28-37, Ottawa, Canada, May 1997.

Horn, B., "Height and Gradient from Shading", International Journal of Computer Vision, No. 5, pp. 37-76, year 1990.

Hung et al., "Time-Averaged Shadow-Moire Method for Studying Vibrations", Applied Optics Journal, vol. 16, No. 6, pp. 1717-1719, Jun. 1977.

Idesawa et al., "Scanning Moire Method and Automatic Measurement of 3-D Shapes", Applied Optics Journal, vol. 16, No. 8, pp. 2152-2162, Aug. 1977.

Takeda et al., "Fourier Transform Methods of Fringe-Pattern Analysis for Computer-Based Topography and Interferometry", Journal of Optical Society of America, vol. 72, No. 1, Jan. 1982.

International Application PCT/IL2007/000262 Search Report dated Oct. 16, 2008.

International Application PCT/IL2007/000262 Preliminary Report on Patentability dated Mar. 19, 2009.

International Application PCT/IL2007/000306 Search Report dated Oct. 2, 2008.

International Application PCT/IL2007/000306 Preliminary Report on Patentability dated Mar. 19, 2009.

International Application PCT/IL2006/000335 Preliminary Report on Patentability dated Apr. 24, 2008.

International Application PCT/IL2007/000327 Search Report dated Sep. 26, 2008.

International Application PCT/IL2007/000327 Preliminary Report on Patentability dated Mar. 12, 2009.

International Application PCT/IL2008/000458 Search Report dated Oct. 28, 2008.

International Application PCT/IL2009/000285 Search Report dated Jun. 11, 2009.

Kimmel et al., "Analyzing and Synthesizing Images by Evolving Curves with the Osher-Sethian Method", International Journal of Computer Vision, 24(1), pp. 37-56, year 1997.

Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.

LeClerc et al., "The Direct Computation of Height From Shading", Proceedings of Computer Vision and Pattern Recognition, pp. 552-558, year 1991.

Lim et al., "Additive Type Moire with Computer Image Processing", Applied Optics Journal, vol. 28, No. 13, pp. 2677-2680, Jul. 1, 1989.

Mendlovic, et al., "Composite Harmonic Filters for scale, projection and shift invariant pattern recognition", Applied Optics Journal, vol. 34, No. 2, pp. 310-316, Jan. 10, 1995.

Takasaki, H., "Moire Topography", Applied Optics Journal, vol. 12, No. 4, pp. 845-850, Apr. 1973.

Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.

Sazbon et al., "Qualitative Real-Time Range Extraction for Preplanned Scene Partitioning Using Laser Beam Coding", Pattern Recognition Letters 26, pp. 1772-1781, year 2005.

Shpunt et al., U.S. Appl. No. 61/157,560 "Reference Image Techniques for 3D Sensing" filed Mar. 5, 2009.

Shpunt et al., U.S. Appl. No. 61/229,754 "Pattern-Based Depth Mapping with Stereoscopic Assistance" filed Jul. 30, 2009.

Sjodahl et al., "Measurement of Shape by Using Projected Random and Patterns and Temporal Digital Speckle Photography", Applied Optics Journal, vol. 38, No. 10, pp. 1990-1997, Apr. 1, 1999.

Spektor et al., U.S. Appl. No. 61/162,309 "Integrated Chip with Experience Understanding" filed Mar. 22, 2009.

Su et al., "Application of Modulation Measurement Profilometry to Objects with Surface Holes", Applied Optics Journal, vol. 38, No. 7, pp. 1153-1158, Mar. 1, 1999.

Takasaki, H., "Moire Topography", Applied Optics Journal, vol. 9, No. 6, pp. 1467-1472, Jun. 1970.

Japanese Patent Application # 2008558981 Official Action dated Nov. 2, 2011.

U.S. Appl. No. 12/522,171 Official Action dated Dec. 22, 2011.

Chinese Patent Application # 2006800038004.2 Official Action dated Nov. 24, 2011.

Japanese Patent Application # 2008558984 Official Action dated Nov. 1, 2011.

U.S. Appl. No. 13/043,488 Official Action dated Jan. 3, 2012.

Japanese Patent Application # 2008535179 Official Action dated Nov. 8, 2011.

U.S. Appl. No. 12/522,171 Official Action dated Apr. 5, 2012.

U.S. Appl. No. 12/397,362 Official Action dated Apr. 24, 2012.

International Application PCT/IB2011/055155 Search Report dated Apr. 20, 2012.

Mor et al., U.S. Appl. No. 12/762,373 "Synchronization of Projected Illumination with Rolling Shutter of Image Sensor" filed Apr. 19, 2010.

Petronius et al., U.S. Appl. No. 61/300,465 "Integrated Photonics Module for Optical Projection" filed Feb. 2, 2010.

Sali et al., U.S. Appl. No. 12/758,047 "Three-Dimensional Mapping and Imaging" filed Apr. 12, 2010.

Garcia et al., U.S. Appl. No. 12/703,794 "Depth Ranging with Moire Patterns" filed Feb. 11, 2010.

Shpunt et al., U.S. Appl. No. 12/707,678 "Reference Image Techniques for 3D sensing" filed Feb. 18, 2010.

Luxtera Inc., "Luxtera Announces World's First 10GBit CMOS Photonics Platform", Carlsbad, USA, Mar. 28, 2005 (press release).

Lee et al., "Variable Pulse Mode Driving IR Source Based 3D Robotic Camera", MVA2005 IAPR Conference on Machine Vision Applications, pp. 530-533, Japan, May 16-18, 2005.

Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.

Beraldin et al., "Active 3D Sensing", Scuola Normale Superiore Pisa, vol. 10, pp. 22-46, Apr. 2000.

Bhat et al., "Ordinal Measures for Image Correspondence", IEEE Transactions on Pattern Analysis and Machine Intelligence, vol. 20, No. 4, pp. 415-423, Apr. 1998.

Bradley et al., "Synchronization and Rolling Shutter Compensation for Consumer Video Camera Arrays", IEEE International Workshop on Projector-Camera Systems—PROCAMS 2009 (Miami Beach, Florida, 2009).

De Piero et al., "3D Computer Vision Using Structured Light: Design Calibration and Implementation Issues", Advances in Computers, vol. 43, pp. 243-278, Academic Press 1996.

Hongjun et al., "Shape Measurement by Digital Speckle Temporal Sequence Correlation Method", Acta Optica Sinica Journal, vol. 21, No. 10, pp. 1208-1213, Oct. 2001.

Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.

Hsueh et al., "Real-time 3D Topography by Speckle Image Correlation", Proceedings of SPIE Conference on Input/Output and Imaging Technologies, vol. 3422, pp. 108-112, Taiwan, Jul. 1998.

Chinese Patent Application # 200780009053.8 Official Action dated Apr. 15, 2010 (with English translation).

Chinese Patent Application # 200680038004.2 Official Action dated Mar. 30, 2010 (with English translation).

Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.

EZconn Czech A.S., "Site Presentation", Oct. 2009.

Zhang et al., "Shape from intensity gradient", IEEE Transactions on Systems, Man and Cybernetics—Part A: Systems and Humans, vol. 29, No. 3, pp. 318-325, May 1999.

U.S. Appl. No. 13/541,775, filed Jul. 5, 2012.

U.S. Appl. No. 12/282,517 Official Action dated Jun. 12, 2012.

JP Patent Application # 2008558984 Office Action dated Jul. 3, 2012.

U.S. Appl. No. 12/703,794 Official Action dated Aug. 7, 2012.

U.S. Appl. No. 12/522,176 Official Action dated Aug. 2, 2012.

* cited by examiner

FIG. 1

FIG. 4

DEPTH MAPPING USING MULTI-BEAM ILLUMINATION

CROSS-REFERENCE TO RELATED APPLICATION

This application claims the benefit of U.S. Provisional Patent Application 60/885,899, filed Jan. 21, 2007, whose disclosure is incorporated herein by reference.

FIELD OF THE INVENTION

The present invention relates generally to methods and systems for mapping of three-dimensional (3D) objects, and specifically to optical 3D mapping.

BACKGROUND OF THE INVENTION

Various methods are known in the art for optical 3D mapping, i.e., generating a 3D profile of the surface of an object by processing an optical image of the object.

Some methods are based on projecting a laser speckle pattern onto the object, and then analyzing an image of the pattern on the object. For example, PCT International Publication WO 2007/043036, whose disclosure is incorporated herein by reference, describes a system and method for object reconstruction, in which a coherent light source and a generator of a random speckle pattern projects onto the object a coherent random speckle pattern. An imaging unit detects the light response of the illuminated region and generates image data. Shifts of the pattern in the image of the object relative to a reference image of the pattern are used in real-time reconstruction of a 3D map of the object.

Other methods use pulsed modulation in order to measure time of flight of light from an object to a detector. For example, U.S. Pat. No. 6,100,517, whose disclosure is incorporated herein by reference, describes a camera for creating an image indicating distances to points in objects in a scene. A modulated source of radiation, having a first modulation function, directs radiation toward a scene. An array detector, having a second modulation function, different from the first modulation function, detects radiation from the scene. A processor forms an image having an intensity value distribution indicative of the distance to each of the points in the scene based on the detected radiation.

Yet another method for distance mapping is described by Iizuka in "Divergence-Ratio Axi-Vision Camera (Divcam): A Distance Mapping Camera," *Review of Scientific Instruments* 77, 045111 (2006), which is incorporated herein by reference. Two similar infrared (IR) light-emitting diodes (LEDs) are installed for illuminating the same object, one in front of an IR charge-coupled device (CCD) camera and the other behind the camera. One snapshot is taken of the object lighting only the front LED, and another lighting only the back LED. The ratio of the intensities of the two images is used to calculate the distance to the object, based on the decay of the intensities with distance due to the divergence of the light.

SUMMARY OF THE INVENTION

The embodiments of the present invention that are described hereinbelow provide methods and apparatus for 3D mapping of an object, based on illuminating the object with two (or more) beams of radiation having different beam characteristics. An image capture assembly captures at least one image of the object while the object is under illumination by the beams. The local differences in the illumination cast on the object by the beams, as captured in the image, are indicative of the distance of each point on the object from a reference point, such as the location of the image capture assembly. These local differences may thus be analyzed in order to generate the 3D map of the object.

The use of multiple beams with different beam characteristics affords substantial flexibility in the design and deployment of the apparatus. This feature obviates the need for multiple light sources to be positioned at different distances from the object, as in some systems that are known in the art. Embodiments of the present invention permit the beams to be generated either by multiple illumination source or by a single source, and to illuminate the object either sequentially, in separate image frames, or simultaneously in a single image frame, as explained hereinbelow.

There is therefore provided, in accordance with an embodiment of the present invention, a method for mapping an object, including:

illuminating the object with at least two beams of radiation having different beam characteristics;

capturing at least one image of the object under illumination with each of the at least two beams;

processing the at least one image to detect local differences in an intensity of the illumination cast on the object by the at least two beams; and analyzing the local differences in order to generate a three-dimensional (3D) map of the object.

The at least two beams may have different respective divergence characteristics, different geometrical shapes, or different wavelengths, or may be configured so as to project different patterns on the object.

Illuminating the object may include generating the at least two beams using light originating from a single source. Alternatively, the at least two beams may be generated using light originating from different sources in different respective positions, wherein the different respective positions of the different sources may be located at equal respective distances from a plane of the object.

Capturing the at least one image may include capturing a single image under the illumination of both beams or capturing first and second images under illumination of the object by first and second beams, respectively.

In a disclosed embodiment, the at least two beams include first and second beams having known, respective intensity distributions $I_1(x, y, z)$ and $I_2(x, y, z)$, and capturing the image includes detecting first and second intensity patterns on the object $D_1(x, y, z)$ and $D_2(x, y, z)$ using an image capture device, wherein z is a distance from the image capture device to each point (x,y) on the object, and analyzing the local differences includes inverting an equation of a form $$\frac{I_1(x, y, z)}{I_2(x, y, z)} = \frac{D_1(x, y, z)}{D_2(x, y, z)}$$

in order to generate the 3D map of z as a function of (x,y).

In some embodiments, the image processor is configured to analyze the local differences in the intensity of the illumination cast on the object by the at least two beams in order to generate the 3D map while canceling ambiguities due to ambient light reflected from the object. In one embodiment, the at least two beams include three beams, and the image processor is configured to use the at least one image captured under the illumination with each of the three beams to cancel the ambiguity.

In some embodiments, capturing the at least one image includes capturing a succession of images while the object is moving, and analyzing the local differences includes mapping a 3D movement of the object. In one embodiment, the object is a part of a human body, and the 3D movement includes a gesture made by the part of the human body, and mapping the 3D movement includes providing an input to a computer application responsively to the gesture.

There is also provided, in accordance with an embodiment of the present invention, apparatus for mapping an object, including:

an illumination assembly, which is configured to illuminate the object with at least two beams of radiation having different beam characteristics;

an image capture assembly, which is configured to capture at least one image of the object under illumination with each of the at least two beams; and an image processor, which is configured to process the at least one image to detect local differences in an intensity of the illumination cast on the object by the at least two beams, and to analyze the local differences in order to generate a three-dimensional (3D) map of the object.

The present invention will be more fully understood from the following detailed description of the embodiments thereof, taken together with the drawings in which:

DETAILED DESCRIPTION OF EMBODIMENTS

Figure 1:
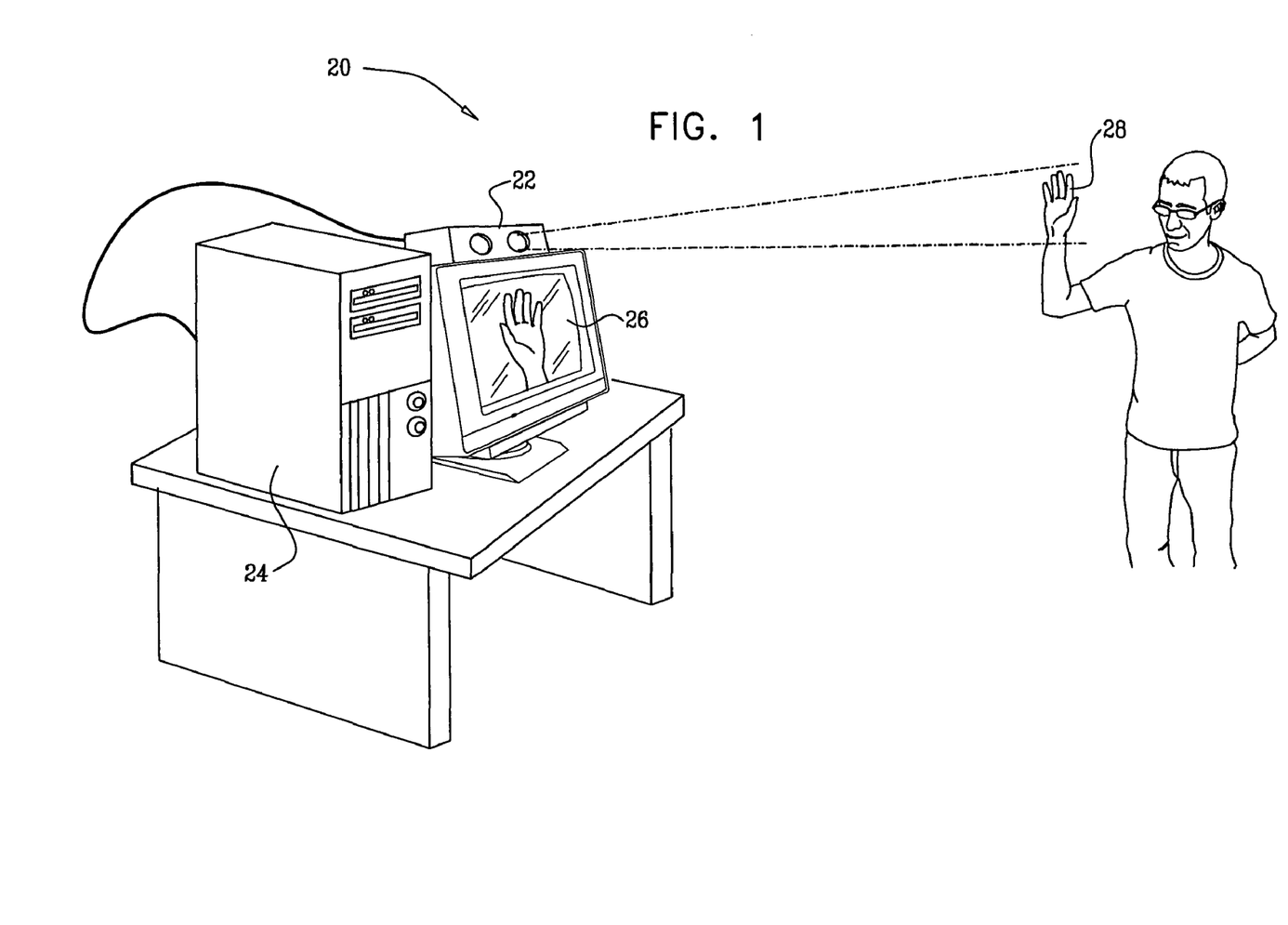
FIG. 1 is a schematic, pictorial illustration of a system for 3D mapping, in accordance with an embodiment of the present invention.

FIG. 1 is a schematic, pictorial illustration of a system 20 for 3D optical mapping, in accordance with an embodiment of the present invention. System 20 comprises an imaging device 22, which generates and projects multiple beams of radiation onto an object 28 and captures images showing the illumination that is cast on and returned from the object. Details of the design and operation of device 22 are shown in the figures that follow and are described hereinbelow with reference thereto. Although the embodiments described hereinbelow use, for the most part, two different beams of radiation to illuminate the object, the principles of the present invention may similarly be applied in systems that use three or more illumination beams.

The multiple beams projected by device 22 have different beam characteristics, which result in distinguishably-different aspects of the illumination that is cast on the object by the different beams. For example, the beams may have different divergence characteristics, meaning that the intensity of one beam as a function of distance from device 22 drops at a different rate from another beam. Additionally or alternatively, the beams may have different geometrical shapes or may otherwise project different sorts of patterned light, such as a speckle pattern, or may have different wavelengths. These differences make it possible to distinguish the illumination due to each of the beams even when they are projected simultaneously. It is not necessary for the operation of device 22 that the beams be generated by different light sources at different distances from the plane of object 28 (in contrast to the system described in the above-mentioned article by Iizuka, for example). In fact, the beams may be generated by a single source using suitable optics to create the multiple beams.

An image processor 24 processes image data generated by device 22 in order to reconstruct a 3D map of object 28. The term "3D map" refers to a set of 3D coordinates representing the surface of the object. The derivation of such a map based on image data is referred to herein as "3D mapping" or equivalently, "3D reconstruction." Image processor 24 computes the 3D coordinates of points on the surface of object 28 by detecting differences in the intensity of the illumination that is cast on each point of the object by each of the illumination beams. The methods that may be used for this purpose are described hereinbelow with reference to FIG. 2.

Image processor 24 may comprise a general-purpose computer processor, which is programmed in software to carry out the functions described hereinbelow. The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by suitable dedicated circuitry within the housing of the imaging device or otherwise associated with the imaging device.

The 3D map that is generated by processor 24 may be used for a wide range of different purposes. For example, the map may be sent to an output device, such as a display 26, which shows a pseudo-3D image of the object. In the example shown in FIG. 1, object 28 comprises all or a part (such as a hand) of the body of a subject. In this case, system 20 may be used to provide a gesture-based user interface, in which user movements detected by means of device 22 control an interactive computer application, such as a game, in place of tactile interface elements such as a mouse, joystick or other accessory. For this purpose, device 22 captures a sequence of images, which are processed by image processor 24 in order to map 3D movement of the object. Alternatively, system 20 may be used to create 3D maps of objects of other types, for substantially any application in which 3D coordinate profiles are needed.

Figure 2:
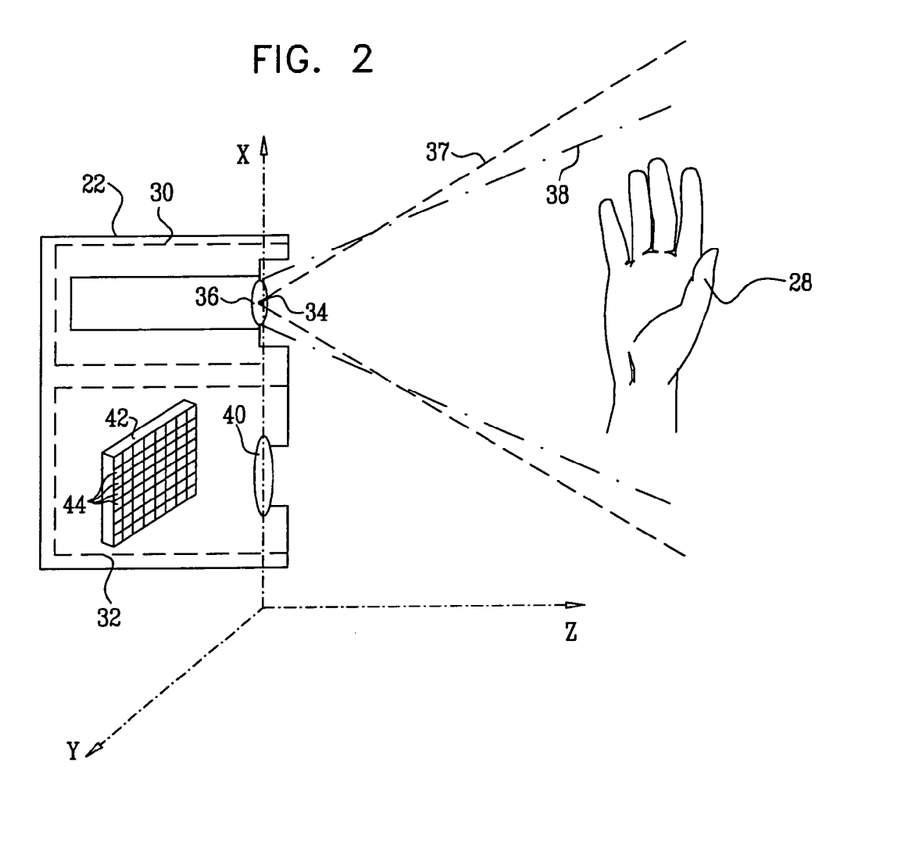
FIG. 2 is a schematic top view of an imaging device for use in 3D mapping, in accordance with an embodiment of the present invention.

FIG. 2 is a schematic top view of device 22, in accordance with an embodiment of the present invention. An illumination assembly 30 in device 22 comprises light sources 34 and 36, which are operated either simultaneously or sequentially to project respective illumination onto object 28. In the example shown in FIG. 2, source 34 has a narrow extent and generates a beam 37 with large divergence. Source 36 has a larger area and thus generates a beam 38 with smaller divergence than source 34. Sources 34 and 36 may be generated, for example, using a suitable laser source, or two laser sources, with appropriate optics, as are known in the art. Alternatively, the source may comprise any suitable type of incoherent light source, such as a LED or lamp. The two sources in this example are effectively co-located, and are thus at the same distance from the plane of object 28. For convenience and clarity in the figures and in the description that follows, Cartesian axes are shown for purposes of reference in the figures, and the distance from device 22 to object 28 is measured along the Z-axis.

An image capture assembly 32 captures an image of the light that is cast by illumination assembly 30 onto object 28 and reflected back by the object. For convenience and clarity of illustration, illumination assembly 30 and image capture assembly 32 are positioned side by side in FIG. 2. Alternatively, assemblies 30 and 32 may be configured so that their respective optical axes are coaxial, using a suitable beamsplitter (not shown), for example. This latter configuration may be advantageous in avoiding shadowing in the images that are captured by the image capture assembly.

Image capture assembly 32 comprises objective optics 40, which focus the image onto an image sensor 42, comprising an array of detector elements 44. Typically, sensor 40 comprises a rectilinear array of detector elements 44, such as a CCD or CMOS-based image sensor array. Assembly 32 may also comprise one or more bandpass filters (not shown in the figures), chosen and positioned so that sensor 42 receives only light in the emission band or bands of light sources 34 and 36, while filtering out ambient light that might otherwise reduce the contrast of the image of the projected pattern that is captured by the sensor.

In the embodiment shown in FIG. 2, illumination assembly 30 and image capture assembly 32 are held in a fixed spatial relation. This configuration and the processing techniques used by image processor 24 make it possible to perform 3D mapping using the single image capture assembly, without relative movement between the illumination and image capture assemblies and without moving parts. Alternatively, the techniques of illumination and mapping that are described hereinbelow may be used in conjunction with other sorts of image capture assemblies, in various different configurations. For example, the image capture assembly may be movable relative to the illumination assembly. Additionally or alternatively, two or more image capture assemblies may be used to capture images of object 28 from different angles.

For purposes of 3D mapping, image processor 24 determines the distance (z-coordinate) of different points (x,y) on object 28 based on the differences in the illumination cast on and reflected by the object due to sources 34 and 36. For this purpose, it is important that the respective illumination due to each of the sources be distinguishable from the other source. One way to distinguish the sources is to operate them sequentially, so that each image captured by assembly 32 is due to only one of the two sources. Sequential operation, however, may be problematic when object 28 is moving from frame to frame.

Therefore, in some embodiments, sources 34 and 36 operate simultaneously, so that each image frame captures light reflected from the object due to each of the sources. In the context of the present patent application and in the claims, the terms "light" and "illumination" refer to optical radiation of any wavelength, including infrared and ultraviolet, as well as visible, radiation. To distinguish the light due to the two sources, each source may radiate light at a different wavelength, and imaging assembly 32 may comprise appropriate means (not shown, such as filters) for optically separating and detecting the images of object 28 at each wavelength. For example, each detector elements 44 may have an appropriate color filter, or assembly 32 may comprise two or more image sensors, with a dichroic beamsplitter for casting the light due to each of the sources onto a different sensor.

As another example, one or both of the sources may emit patterned light with a known, respective pattern. Image processor 24 may then extract the pattern from the images captured by imaging assembly 32 and analyze the brightness of the pattern in order to measure the intensity of the illumination due to each source, even in the absence of wavelength discrimination. High-contrast patterns, such as a primary laser speckle pattern or structured light, are advantageous for this purpose. For instance, source 36 could comprise a diffuser generating a laser speckle pattern, while source 34 generates a pattern without spatial modulation, i.e., a constant pattern. The brightness of pixels in dark areas of the speckle pattern in the images captured by assembly 32 will be due almost entirely to source 34. Assuming the reflectivity of object 28 is roughly constant, this brightness may be measured and subtracted out of the pixels in the bright areas of the speckle pattern in order to determine the component of the brightness that is due to source 36. Alternatively or additionally, discrimination between the sources can be achieved by other computational methods known in the art, such as belief propagation or other methods of inference, or coding and decoding techniques similar to those used in some communication applications.

Thus, assuming beams 37 and 38 from sources 34 and 36 have suitable distinguishing characteristics, image processor 24 is able to extract, even from a single image, the respective light intensities $D_1(x, y, z)$ and $D_2(x, y, z)$ detected by imaging assembly 32 due to reflection of the two illumination beams from points (x, y, z) on the surface of object 28. The x and y coordinates correspond to pixel coordinates in the image, but the z-coordinate is implicit and cannot be determined unambiguously from the reflected intensities alone. The z-coordinate is therefore inferred by the image processor from comparison of the reflected intensities, as explained below:

Assuming the known beam patterns in space due to sources 34 and 36 may be represented respectively as $I_1(x, y, z)$ and $I_2(x, y, z)$, the detected intensities will then be given by:

$$D_1(x, y, z) = \frac{\alpha(x, y) I_1(x, y, z)}{R^2(x, y)} \quad (1)$$

$$D_2(x, y, z) = \frac{\alpha(x, y) I_2(x, y, z)}{R^2(x, y)} \quad (2)$$

wherein $\alpha(x, y)$ is the reflectivity of each point on the object 28 and $R(x, y)$ is the distance from the imaging assembly to each such point. For $z \gg x, y$, $R(x, y) \cong z(x, y)$, wherein z is the distance from the image capture assembly to each point (x,y) on the object. Because the area illuminated by beam 37 grows at a faster relative rate than beam 38 (since source 34 is smaller than source 36), $I_1(x, y, z)$ decreases more rapidly with increasing z than does $I_2(x, y, z)$.

Comparing equations (1) and (2) permits the effect of local reflectivity $\alpha(x, y)$ to be factored out, resulting in the relation:

$$\frac{I_1(x, y, z)}{I_2(x, y, z)} = \frac{D_1(x, y, z)}{D_2(x, y, z)} \quad (3)$$

As long as $I_1(x, y, z)$ and $I_2(x, y, z)$ are sufficiently different, in terms of their functional dependence on z, image processor 24 can invert this equation for each z to give z(x, y) in equations (1) and (2). In other words, since the intensity of beam 37 in FIG. 2 drops at a known, faster rate with increasing distance from device 22 than does beam 38, the image processor is able to infer the distance z to each point (x,y) on object 28 by comparing the relative intensities $D_1$ and $D_2$ at that point, using the known dependence of $I_1$ and $I_2$ on z. The image processor thus defines a 3D map of object 28, which is the set of coordinates {(x, y, z)} that represent the surface of the object, as determined by the above procedure.

The above derivation assumes that the effect of ambient light, i.e., light other than from sources 34 and 36, can be ignored (due to effective filtering, for example). More generally, the captured intensity is given by $I_S(x, y, z)+I_A(x, y, z)$, wherein $I_S(x, y, z)$ is the reflected source intensity and $I_A(x, y, z)$ is the ambient intensity that is reflected from the same place at the object. When ambient light is taken into account, equation (3) becomes $$\frac{I_1(x, y, z) + I_A(x, y, z)}{I_2(x, y, z) + I_A(x, y, z)} = \frac{D_1(x, y, z)}{D_2(x, y, z)}.$$

As a result, the ambient light may introduce ambiguities into the depth measurement.

The effect of the ambient light can be canceled out by various techniques. One possible method, for example, is to project three beams of light onto the object and solve the resulting system of two equations for R and $I_A(x, y, z)$.

Alternatively, even with only two projected beams, it is still possible to discriminate depth in the presence of ambient light by applying suitable inference techniques and assumptions. For example, it can generally be assumed that the level of ambient light varies slowly over the image, and therefore that the ambient light level in one area of the image whose depth is to be computed is approximately equal to the ambient light level that has been inferred or is to be inferred in neighboring areas. The processor may use this assumption in choosing the depth values that result in maximal consistency of ambient levels over the entire image. Various computational techniques that may be used for this purpose are known in the art. One possibility is to apply belief propagation techniques, such as those described by Achan et al., in "Phase Unwrapping by Minimizing Kikuchi Free Energy," *IEEE International Geoscience and Remote Sensing Symposium* (Toronto, Canada, June 2002), pages 1738-1740, which is incorporated herein by reference.

Figure 3:
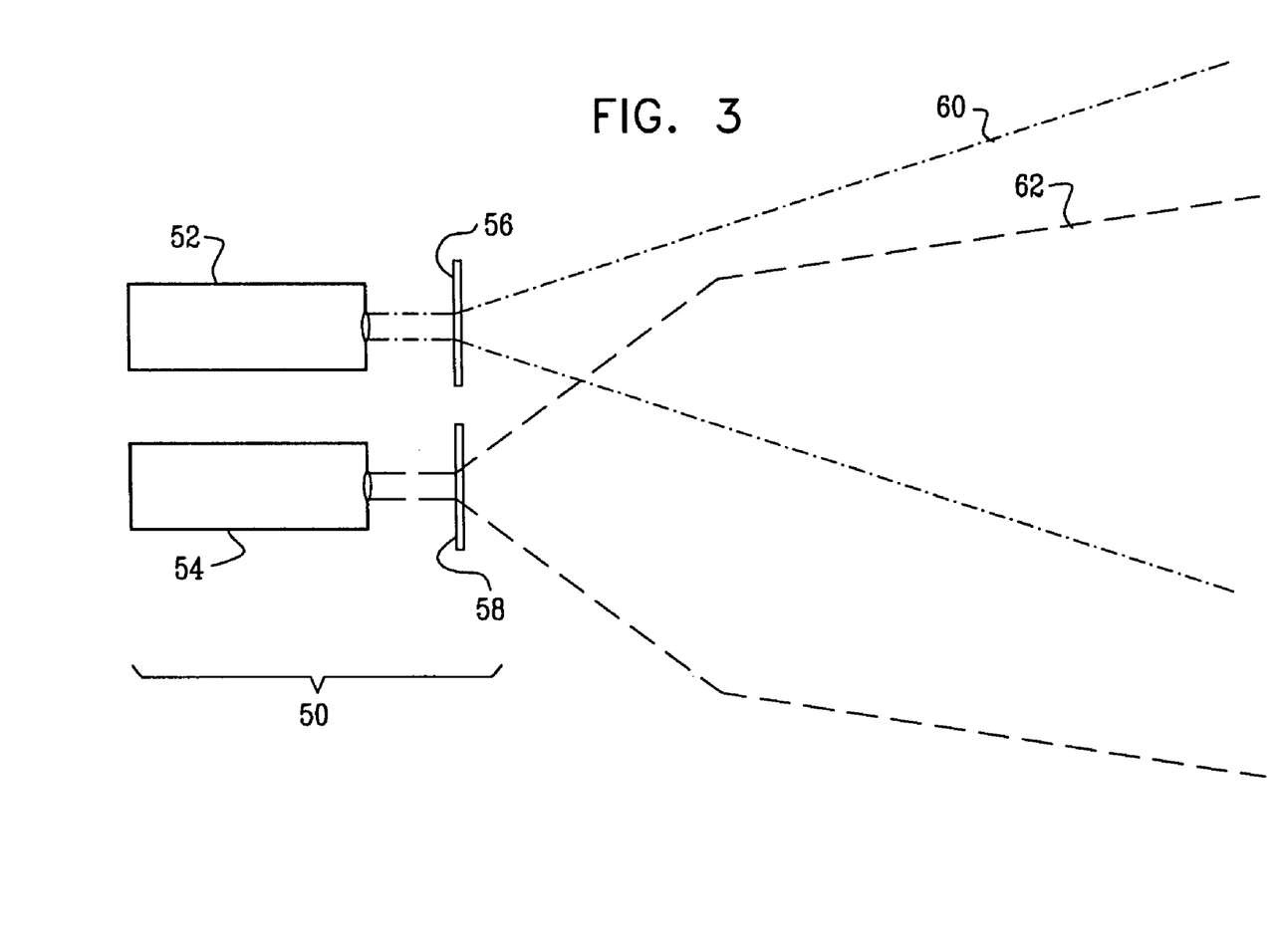
FIG. 3 is a schematic top view of an illumination assembly for use in 3D mapping, in accordance with an embodiment of the present invention.

FIG. 3 is a schematic top view of an illumination assembly 50, which may be used in device 22 in place of assembly 30, in accordance with an alternative embodiment of the present invention. In this embodiment, there are two illumination sources: a first laser 52 with a diffuser 56; and a second laser 54 with a diffractive optical element (DOE) 58. The two sources are located at an equal distance from the plane of the object being mapped. The output of laser 52 passing through diffuser 56 generates a beam 60 that is spatially modulated with a primary speckle pattern, as explained above. This beam diverges linearly with distance R from illumination assembly 50, so that the illumination intensity that is incident on the object due to beam 60 drops as $1/R^2$.

On the other hand, DOE 58 is designed so that the output of laser 54 forms a beam 62 with a divergence characteristic in the far field that is different from the divergence characteristic in the near field. Thus, as shown in FIG. 3, the far-field intensity of beam 62 drops with distance at a rate that is not proportional to $1/R^2$. Various methods are known in the art for creating a DOE with this sort of behavior. One possible approach is described by Piestun et al. in "Wave Fields in Three Dimensions: Analysis and Synthesis," *Journal of the Optical Society of America* A 13:9 (1996), pages 1837-1848, which is incorporated herein by reference. Alternatively, the DOE may be designed to give a desired R-variation in the Fresnel region (near field). As another option, a lens could be used to focus one beam some distance away from the caustic of the other beam, thus creating effectively different relative beam divergence rates. In any case, image processor 24 uses the known difference in R-dependence (or equivalently, z-dependence) of beams 60 and 62 in order to create a 3D map of the object, as described above.

Alternatively or additionally, a DOE or other suitable optical element may be used to give a change of shape of one of the beams illuminating the object relative to the other beam.

Figure 4:
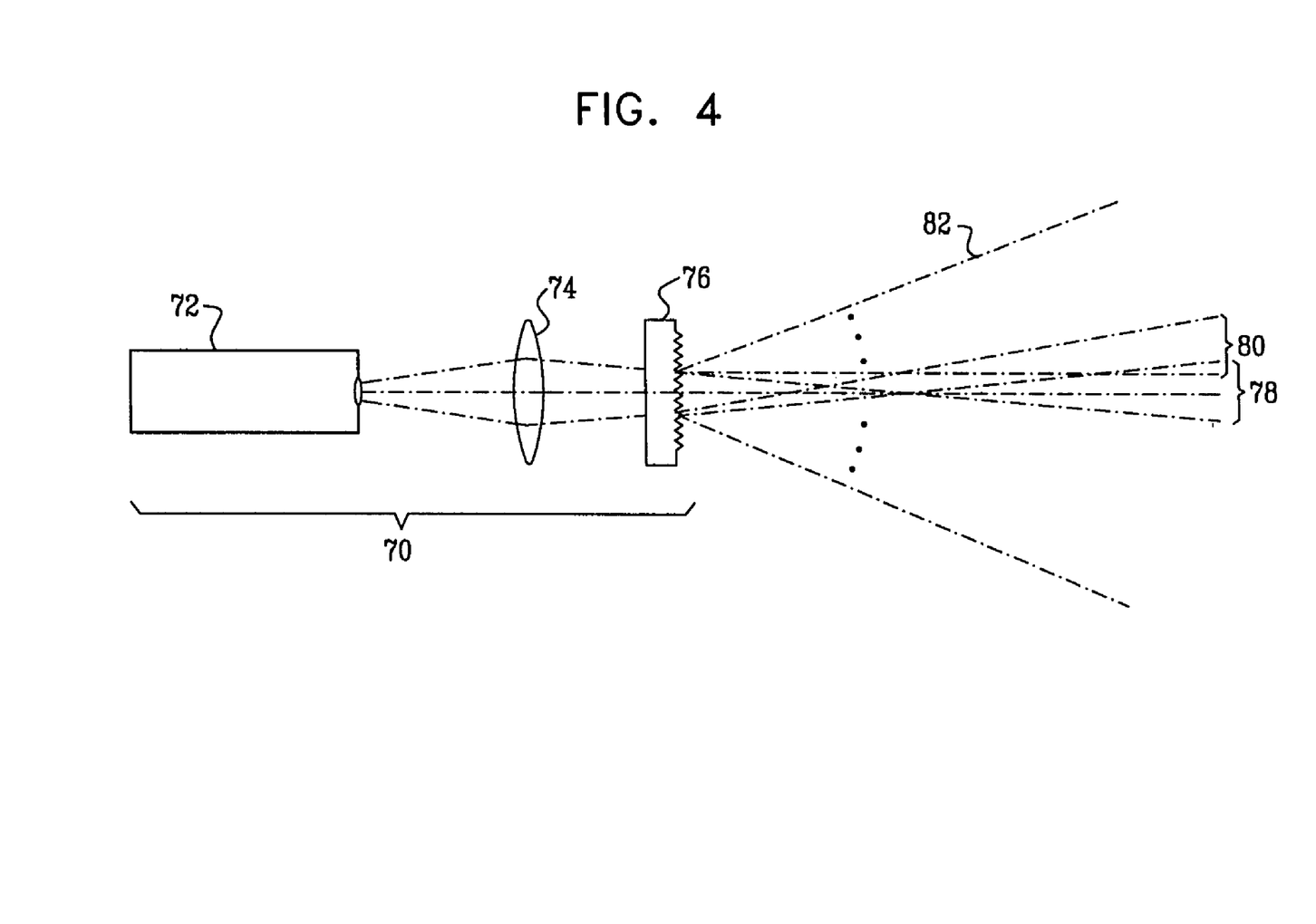
FIG. 4 is a schematic top view of an illumination assembly for use in 3D mapping, in accordance with another embodiment of the present invention.

FIG. 4 is a schematic top view of an illumination assembly 70, which may be used in device 22 in place of assembly 30, in accordance with yet another embodiment of the present invention. In this embodiment, a single source, such as a laser 72, is used in generating multiple beams for illuminating the object. The laser beam is focused by a lens 74 and then split into multiple spots by a Dammann grating 76, which is a type of grating that creates multiple diffraction orders of equal intensities. Lens 74 focuses the laser beam to a waist beyond grating 76, i.e., at a distance $z_0$ between the grating and the object. The combination of the lens and grating creates multiple diverging beams 78, 80, . . . , at different angles, together define a summed beam 82. It can be seen in the figure that due to the operation of lens 74, beams 78, 80, . . . , diverge more slowly than beam 82 up to distance $z_0$, and then diverge more rapidly beyond this distance.

When assembly 70 is used in device 22, image processor 24 is able to compare the intensity of light reflected from object 28 in each of the spots due to beams 78, 80, . . . , to the mean intensity over beam 82 in order to measure the depth of different points on the object, as described above. Alternatively, if an axicon is used in place of lens 74, for example, beams 78, 80, . . . , will define rings, whose radii may be used to determine the distances at which they are incident on the object. Further alternatively or additionally, the distance between pairs of spots (or rings) due to pairs of beams 78, 80, . . . , may be measured in order to compute the depth. Further alternatively, other types of optical elements and filters may be used in modifying the beam characteristics of the beams generated by grating 76.

Although a number of specific optical setups are shown and described above in order to illustrate how beams with different beam characteristics may be created for the purpose of 3D mapping, other schemes for creation of multiple, distinguishable beams with different behavior as a function of distance from the beam source will be apparent to those skilled in the art. All such schemes, when combined with the principles of intensity-based 3D mapping that are described above, are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for mapping an object, comprising:
    illuminating the object with at least first and second beams of radiation having different beam divergence characteristics, wherein an intensity of the first beam as a function of distance from an imaging device drops at a different rate from the second beam;
    capturing, using the imaging device, at least one image of the object under illumination with each of the at least first and second beams;

processing the at least one image to detect local differences in an intensity of the illumination cast on the object by the at least first and second beams; and analyzing the local differences in order to generate a three-dimensional (3D) map of the object.

2. The method according to claim 1, wherein the at least first and second beams have different geometrical shapes.

3. The method according to claim 1, wherein the at least first and second beams have different wavelengths.

4. The method according to claim 1, wherein the at least first and second beams are configured so as to project different patterns on the object.

5. The method according to claim 1, wherein illuminating the object comprises generating the at least first and second beams using light originating from a single source.

6. The method according to claim 1, wherein illuminating the object comprises generating the at least first and second beams using light originating from different sources in different respective positions.

7. The method according to claim 6, wherein the different respective positions of the different sources are located at equal respective distances from a plane of the object.

8. The method according to claim 1, wherein capturing the at least one image comprises capturing a single image under the illumination of the at least first and second beams.

9. The method according to claim 1, wherein capturing the at least one image comprises capturing first and second images under illumination of the object by the first and second beams, respectively.

10. The method according to claim 1, wherein the first and second beams have known, respective intensity distributions $I_1(x, y, z)$ and $I_2(x, y, z)$, and wherein capturing the image comprises detecting first and second intensity patterns on the object $D_1(x, y, z)$ and $D_2(x, y, z)$ using an image capture device, wherein z is a distance from the image capture device to each point (x,y) on the object, and wherein analyzing the local differences comprises inverting an equation of a form $$\frac{I_1(x, y, z)}{I_2(x, y, z)} = \frac{D_1(x, y, z)}{D_2(x, y, z)}$$

in order to generate the 3D map of z as a function of (x,y).

11. The method according to claim 1, wherein analyzing the local differences comprises processing the local differences in the intensity of the illumination cast on the object by the at least first and second beams in order to generate the 3D map while canceling ambiguity due to ambient light reflected from the object.

12. The method according to claim 11, wherein the at least first and second beams comprise three beams, and wherein canceling the ambiguity comprises using the at least one image captured under the illumination with each of the three beams to cancel the ambiguity.

13. The method according to claim 1, wherein capturing the at least one image comprises capturing a succession of images while the object is moving, and wherein analyzing the local differences comprises mapping a 3D movement of the object.

14. The method according to claim 13, wherein the object is a part of a human body, and wherein the 3D movement comprises a gesture made by the part of the human body, and wherein mapping the 3D movement comprises providing an input to a computer application responsively to the gesture.

15. Apparatus for mapping an object, comprising:

an illumination assembly, which is configured to illuminate the object with at least first and second beams of radiation having different beam divergence characteristics, wherein an intensity of the first beam as a function of distance from the apparatus drops at a different rate from the second beam;

an image capture assembly, which is configured to capture at least one image of the object under illumination with each of the at least first and second beams; and an image processor, which is configured to process the at least one image to detect local differences in an intensity of the illumination cast on the object by the at least first and second beams, and to analyze the local differences in order to generate a three-dimensional (3D) map of the object.

16. The apparatus according to claim 15, wherein the at least first and second beams have different geometrical shapes.

17. The apparatus according to claim 15, wherein the at least first and second beams have different wavelengths.

18. The apparatus according to claim 15, wherein the at least first and second beams are configured so as to project different patterns on the object.

19. The apparatus according to claim 15, wherein the illumination assembly comprises a single light source for generating the at least first and second beams.

20. The apparatus according to claim 15, wherein the illumination assembly comprises at least two different light sources in different, respective positions for respectively generating the at least first and second beams.

21. The apparatus according to claim 20, wherein the different respective positions of the different sources are located at equal respective distances from a plane of the object.

22. The apparatus according to claim 15, wherein the image capture assembly is configured to capture a single image under the illumination of the at least first and second beams, and wherein the image processor is configured to process the single image in order to generate the 3D map.

23. The apparatus according to claim 15, wherein the image capture assembly is configured to capture first and second images under illumination of the object by the first and second beams, respectively, and wherein the image processor is configured to generate the 3D map by processing the first and second images.

24. The apparatus according to claim 15, wherein the at least first and second beams have known, respective intensity distributions $I_1(x, y, z)$ and $I_2(x, y, z)$, and wherein the image capture device is configured to detect first and second intensity patterns on the object $D_1(x, y, z)$ and $D_2(x, y, z)$, wherein z is a distance from the image capture device to each point (x,y) on the object, and wherein the image processor is configured to invert an equation of a form $$\frac{I_1(x, y, z)}{I_2(x, y, z)} = \frac{D_1(x, y, z)}{D_2(x, y, z)}$$

in order to generate the 3D map of z as a function of (x,y).

25. The apparatus according to claim 15, wherein the image processor is configured to analyze the local differences in the intensity of the illumination cast on the object by the at least first and second beams in order to generate the 3D map while canceling ambiguities due to ambient light reflected from the object.

26. The apparatus according to claim 25, wherein the at least first and second beams comprise three beams, and wherein the image processor is configured to use the at least one image captured under the illumination with each of the three beams to cancel the ambiguity.

27. The apparatus according to claim 15, wherein the image processor is configured to process a succession of images captured while the object is moving so as to map a 3D movement of the object.

28. The apparatus according to claim 27, wherein the object is a part of a human body, and wherein the 3D movement comprises a gesture made by the part of the human body, and wherein the image processor is coupled to provide an input to a computer application responsively to the gesture.

29. The method according to claim 1, wherein illuminating the object comprises generating at least one of the beams by illuminating a diffractive optical element with a laser.

30. The method according to claim 1, wherein illuminating the object comprises generating the at least first and second beams using respective sources having different, respective areas.

31. The method according to claim 1, wherein illuminating the object comprises generating multiple first diverging beams at different angles, which together define a summed second beam, and wherein processing the at least one image comprises comparing the intensity of the illumination due to the first diverging beams to a mean intensity due to the summed second beam.

32. The apparatus according to claim 15, wherein the illumination assembly comprises a diffractive optical element and a laser, which is configured to generate at least one of the beams by illuminating the diffractive optical element.

33. The apparatus according to claim 15, wherein the illumination assembly comprises at least two sources having different, respective areas, which respectively generate the at least first and second beams.

34. The apparatus according to claim 15, wherein the illumination assembly is configured to generate multiple first diverging beams at different angles, which together define a summed second beam, and wherein the image processor is configured to compare the intensity of the illumination due to the first diverging beams to a mean intensity due to the summed second beam.

* * * * *